No. 750,365. PATENTED JAN. 26, 1904.
T. G. INGLE.
NUT LOCK.
APPLICATION FILED JULY 1, 1903.
NO MODEL.
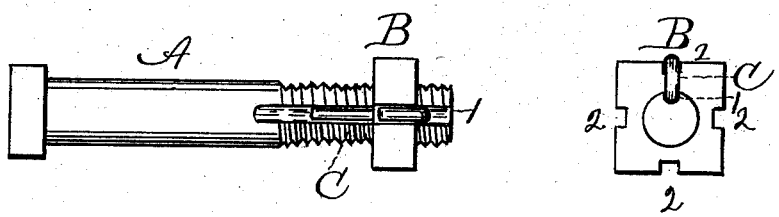
Fig. 1. Fig. II.
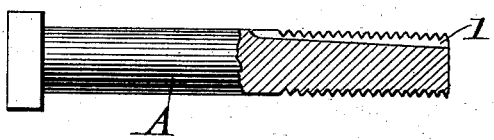
Fig. 3.
Witnesses
Inventor
By Thomas G. Ingle
B. Pickering Attorney.

No. 750,365. Patented January 26, 1904.

UNITED STATES PATENT OFFICE.

THOMAS G. INGLE, OF DAYTON, OHIO, ASSIGNOR OF ONE-HALF TO JOHN H. HUESMAN, OF DAYTON, OHIO.

NUT-LOCK.

SPECIFICATION forming part of Letters Patent No. 750,365, dated January 26, 1904.

Application filed July 1, 1903. Serial No. 163,833. (No model.)

*To all whom it may concern:*

Be it known that I, THOMAS G. INGLE, a citizen of the United States, residing at Dayton, in the county of Montgomery and State of Ohio, have invented a certain new and useful Improvement in Nut-Locks; and I do hereby declare that the following is a full, clear, and exact description thereof, which will enable others skilled in the art to which it appertains to make and use the same, reference being had to the accompanying drawings, and to the letters and numerals of reference marked thereon, which form a part of this specification.

My invention relates to improvements in nut-locks, the features of which will be fully hereinafter described and claimed.

The object of my invention is the construction of a nut-lock that will be simple and effective.

The construction is illustrated in the accompanying drawings, in which—

Figure 1 is an elevation of a bolt with the nut attached. Fig. 2 is an end view of the same. Fig. 3 is a central longitudinal section through the groove.

Like letters and numerals designate like parts in the views.

At A, Fig. 1, is represented an ordinary bolt, which for the purpose of locking the nut B to the same is provided with the shallow groove 1, which tapers slightly toward the head. The groove is made of sufficient depth to freely receive the wire C in its end.

B is the nut, threaded to engage the bolt and on its outer surface is provided with one or a series of notches 2. At the end of the bolt the groove is deep enough to freely receive the wire without contact with the thread. As the nut is turned on the thread of the same engages the external surface of said wire, and thus it is held within said groove, and when the nut is driven home the outer end of the wire is bent up and made to enter one of the notches in the nut, and thus the same is securely locked to the bolt. A soft pliable wire should be used to prevent the marring of the thread of the nut.

Having fully described my invention, what I claim, and desire to secure by Letters Patent, is—

A bolt having a tapered longitudinal groove, a nut having a longitudinal notch in its side faces, and a key constructed to enter the bolt-groove and adapted to be engaged by the thread of the nut, and bent at its outer end to engage the notched face of the nut, all combined as set forth.

In testimony that I claim the foregoing as my own I affix my signature in presence of two witnesses.

THOMAS G. INGLE.

Witnesses:
   B. PICKERING,
   URIAH C. HARTRANFT.